United States Patent
Wilkie

[11] Patent Number: 5,985,426
[45] Date of Patent: Nov. 16, 1999

[54] BIAXIALLY ORIENTED POLYPROPYLENE FILM WITH COLD SEAL RELEASE SURFACE

[75] Inventor: Andrew F. Wilkie, Haverhill, Mass.

[73] Assignee: Applied Extrusion Technologies, Inc., Peabody, Mass.

[21] Appl. No.: 08/812,971

[22] Filed: Mar. 5, 1997

Related U.S. Application Data

[63] Continuation of application No. 08/510,137, Sep. 6, 1995, abandoned.

[51] Int. Cl.⁶ .............................. B32B 7/12; B32B 27/32
[52] U.S. Cl. ..................... 428/215; 428/216; 428/349; 428/354; 428/409; 428/516
[58] Field of Search .................................. 428/515, 200, 428/215, 216, 349, 352, 516, 409, 354; 53/477, 459; 427/564, 570, 308

[56] References Cited

U.S. PATENT DOCUMENTS

| | | | |
|---|---|---|---|
| 4,526,919 | 7/1985 | Edwards | 524/232 |
| 4,528,312 | 7/1985 | Edwards | 524/232 |
| 4,618,527 | 10/1986 | Doyen | 428/213 |
| 4,859,521 | 8/1989 | Pike et al. | 428/195 |
| 5,232,966 | 8/1993 | Chen et al. | 524/224 |
| 5,252,384 | 10/1993 | Bothe et al. | 428/212 |
| 5,340,917 | 8/1994 | Eckman et al. | 528/481 |
| 5,366,796 | 11/1994 | Murschall et al. | 428/216 |
| 5,443,915 | 8/1995 | Wilkie et al. | 428/461 |
| 5,527,608 | 6/1996 | Kemp-Patchett et al. | 428/349 |

*Primary Examiner*—Paul Thibodeau
*Assistant Examiner*—D. Lawrence Tarazano
*Attorney, Agent, or Firm*—Caesar, Rivise, Bernstein, Cohen & Pokotilow, Ltd.

[57] ABSTRACT

Packaging film having a surface providing improved release properties from cold seal cohesives. The improved cold seal release properties prevent roll blocking when the film is unspooled from roll stock. Web and laminate packaging films are disclosed which incorporate the improved release properties. The packaging film finds special utility in packaging of heat sensitive articles.

15 Claims, No Drawings

BIAXIALLY ORIENTED POLYPROPYLENE FILM WITH COLD SEAL RELEASE SURFACE

This application is a Continuation of application Ser. No. 08/510,137, filed Sep. 6, 1995 now abandoned.

BACKGROUND OF THE INVENTION

1. Field of the Invention

Cold seal cohesives are generally natural or synthetic rubber latex compounds, which, when applied to a flexible packaging substrate, allow the package to be cohesively sealed by pressure and dwell time at temperatures from ambient to a temperature of less than about 150° F. Cold seal cohesives are particularly useful in wrapping products which are heat sensitive, such as confectioneries. Cold seal cohesives are usually applied in a pattern on to the inside (cold seal receptive surface) of a film lamination. Cold seal cohesives may also be applied to a single web film. In each case the outer film surface (facing away from the cold seal) must repel adhesion of the cold seal cohesive on the inner film surface in order that the typical manner of supplying film, i.e., in roll stock form, may be easily unwound when it is desired to use the film to wrap the product.

The present invention is directed to films of either the single web or lamination form which has improved properties for packaging with cold seal cohesives.

2. Description of the Related Art

In the case of the prior art single web films, the surface of the film opposing the cold seal receptive surface is typically coated with an overlacquer, e.g., a polyamide, in order to provide sufficient release of that surface from the cold seal cohesive, i.e., to prevent what is known in the art as "roll blocking".

In the case where laminated films are used for packaging, the outer web film is generally modified with migratory additives, which, when sufficiently bloomed to the surface, promote low coefficient of friction (C.O.F.) (for machinability) and cold seal release (CSR). It is known from experience that certain migratory additives, particularly amides, coming in intimate contact with the cold seal surface or cohesive, in sufficient quantities, will cause the cold seal cohesive strength to become significantly weakened. This phenomenon is known in the trade as cold seal deadening.

It is also known that biaxially oriented polypropylene (BOPP) film, by itself, does not give adequate cold seal release (CSR) or coefficient of friction (C.O.F.) and requires the addition of additives to accomplish these objectives. These additives, which are predominantly migratory, have two main problems:

(1) They must bloom to the film's surface and remain there in order to be consistently effective; and,
(2) They have a tendency to retard the cold seal cohesive strength.

The current industry standard (state of the art) film for packaging applications is a monolayer BOPP (homopolymer) amide modified film from AET (Applied Extrusion Technology, Inc.) designated B523 or B522. In the case of B523, the slip modified film is corona discharge treated to an equal level on both surfaces and as such can be used on either side. In the case of B522, the film is corona discharge treated on only one surface. The untreated surface is the preferred surface for cold seal release (CSR).

These films need to be aged for a period of time after production thereof, at a certain temperature, so that the CSR and C.O.F. additives sufficiently bloom to the surface for the film to be functional.

In my copending application Ser. No. 08/224,229, filed Apr. 7, 1994, I disclosed the discovery of good to excellent cold seal release in a film without the use of migratory additives or overlacquers. The preferred method disclosed therein was a coextruded skin layer of a polymer blend of ethylene-propylene random copolymer (RCP) and ethylene-butylene (EB) copolymer in the ratio of 60:40 wt %. The skin layer thereof contained crosslinked silicone and Kaolin clay as C.O.F. enhancers. The cold seal release surface was preferably a non-treated, i.e., no corona discharge or other conventional treatments, surface.

The key component of the polymeric blend release system in my previous application was an ethylene-butylene random copolymer in an amount of 20 to 50 wt % of the skin layer where the ethylene content in the ethylene-butylene random copolymer was at least 0.5 wt %.

The present invention concerns cold seal release surfaces which do not contain polybutylene, migratory additives, nor overlacquers.

OBJECTS OF THE INVENTION

It is an object of the invention to provide polymeric films which have useful properties for use in the packaging art, especially the cold seal cohesive packaging art.

It is a further object of the invention to provide new mono- and multi-layer films.

It is still a further object of the invention to provide articles of manufacture having film surfaces possessing good to excellent cold seal release, good anti-blocking characteristics, excellent optics, good lamination and ink bonds, which film surfaces do not poison (deaden) cold seal cohesive properties even after the surfaces have been in intimate contact with each other (i.e., in roll form).

SUMMARY OF THE INVENTION

Articles of manufacture, especially films, having good to excellent cold seal release properties can be obtained by employing conventional linear low density polyethylene (LLDPE), linear ethylene-butene copolymer plastomers (EBP) and syndiotactic homopolymer polypropylene (SNPP), both the latter being produced by metallocene catalyst polymerization, as a cold seal release surface. Conventional high density polyethylene homopolymers (HDPE) also demonstrate useful cold seal release properties.

DETAILED DESCRIPTION OF THE INVENTION

The preferred biaxially oriented polypropylene (BOPP) films of the invention can be fabricated by conventional film manufacturing techniques, such as coextrusion of the various layers of the film. Typically, the films of the invention will comprise a core layer of about 50 to about 100 gauge primarily comprising propylene which may be blended with other additives, although thickness up to about 150 gauge is suitable. A particularly preferred core layer is 69.5 gauge consisting of 99.2 wt % of isotactic homopolymer of propylene which is blended with 1,000 ppm (parts per million) high density polyethylene (HDPE), 800 ppm erucamide, 2,700 ppm stearamide and 2,700 ppm behenamide. Preferably one side of the core layer is surface treated, e.g., corona discharge treated, or other conventional treatment, such as flame treatment.

The film can be biaxially oriented or produced by the Interdraw process, i.e., extrusion coated in the machine direction oriented sheet prior to transverse direction orientation.

The Core Layer

Although the core layer is preferably a homopolymer of isotactic polypropylene, other polyolefins, such as ethylene-propylene random copolymers, or block copolymers, or high density polyethylene may be employed instead of the isotactic polypropylene. It is preferable for the polymer of the core layer to comprise at least 94.2 wt % of a homopolymer of isotactic polypropylene. Additionally, additives to the core layer can include 0 to about 5 wt % HDPE; 0 to about 5,000 ppm erucamide and 0 to about 5,000 ppm behenamide, glycerol monostearate in amounts ranging from 0 to about 5,000 ppm and amines in amounts of 0 to about 5,000 ppm.

In addition to the polymer and the above-mentioned additives, other properties can be imparted to the core such as by cavitation of the polymer material during formation of the core in order to render the core opaque. Other techniques for making the core opaque include incorporation of fillers, such as titanium dioxide. Other methods of imparting voids to the core, such as the use of foaming agent, are also within the scope of the invention.

The Skin Layer

Preferably coextruded with the core layer is an about 2 to about 10 gauge skin layer, adhered on one side to the core layer and having its other (outer) surface exposed. This exposed outer surface is preferably not surface treated by corona discharge, flame treatment, or other similar treatments.

In a particularly preferred embodiment, a 5.5 gauge skin layer is coextruded with the 69.5 gauge core layer material mentioned above. The composition of the skin layer is preferably at least 99.1 wt % of any of the following:

conventional linear low density polyethylene (LLDPE)

ethylene-butene plastomer (formed by a metallocene catalyst)

syndiotactic homopolymer of polypropylene (formed by a metallocene catalyst)

homopolymer of high density polyethylene (HDPE)

Other components of the skin layer include up to 3,000 ppm HDPE, up to 2,500 ppm stearamide, up to 1,500 ppm Kaolin clay and up to 2,000 ppm of cross-linked silicone, preferably having a particle size of from about 1 to 4.5 $\mu$m, most preferably about 3 $\mu$m.

The Cold Seal Receptive Layer

In addition to providing a core having a cold seal release layer, the invention may also provide a cold seal receptive skin layer on a side of the core opposite the cold seal release layer. Such cold seal receptive layer is typically from about 1 to about 10 gauge and fabricated of an ethylene-propylene random copolymer containing from about 2% to about 8% by weight of ethylene and from about 92% to about 98% by weight of propylene.

EXAMPLES

In each of the following examples, the cold seal release polymeric layer, without additives, was coextruded in a conventional laboratory ¾ inch satellite extruder equipped with a grooved feed throat and Maddox mixing section 24:1 length to diameter (L:D) polyethylene type screw. The core layer consisted solely of isotactic polypropylene homopolymer and was extruded through a one inch diameter extruder equipped similarly to the satellite extruder. The cold seal release (CSR) layer comprised 5–15% of the total extruded (cast) sheet thickness. The coextruded (cast) sheet was subsequently biaxially oriented 6× by 6× on a laboratory T.M. Long film orienter. The experimental films were examined for optical properties including % haze and gloss and then for cold seal release properties against two commercially supplied cold seal cohesives.

Example I demonstrates the high cold seal block tendencies of both conventional homopolymer polypropylene (PP) and an ethylene (3.0 wt %) propylene random copolymer (RCP) averaging between 100 and 230 grams/inch, with each of the two commercial cold seal structures. Example I also demonstrates that LLDPE, ethylene-butene copolymer plastomer and a syndiotactic polypropylene homopolymer layer each give very low (<50 grams/inch) improved block properties compared to either (PP) or (RCP). Slightly higher block values were obtained with conventional HDPE and an ethylene based terpolymer plastomer. All films, except the LLDPE, showed excellent optical properties.

Commercially produced BOPP cold seal release films are illustrated in Example II for relative comparison to Example I.

Example I

| Cold Seal Film Release Surface[1] Composition (WT %) | Cold Seal Block Force[2] (GMS/IN) | | Film Haze (%) | Release Film Surface (45°) Gloss |
|---|---|---|---|---|
| | Kraft Singles 16/slice/ commercial Cold Seal | M&M/ Mars Snickers Commercial Cold Seal | | |
| Homopolymer Polypropylene [PP] | 120–200 | 100–230 | 1.1 | 93 |
| Ethylene (3.0%) Propylene [RCP] Random Copolymer (100) | 190 | 220 | 0.6 | 94 |
| Homopolymer High Density [HDPE] Polyethylene (100) | 80 | 65 | 0.9 | 94 |
| Linear Low Density Polyethylene [LLDPE] (100) | 15 | 45 | 3.4 | 84 |
| Ethylene-Butene Plastomer Exxon Exact 3027 Copolymer [EBP] (100) M.I. = 3.5 | 40 | 40 | 0.9 | 89 |
| Ethylene-Butene Plastomer Exxon Exact 3025 Copolymer [EBP] M.I. = 1.2 | 50 | 75 | 0.5 | 93 |
| Syndiotactic Polypropylene [SYNPP] Fina N94080 (100) | 40 | 50 | 0.4 | 92 |
| Ethylene-based Plastomer Exxon Exact 3034 Terpolymer (100) | 45 | 100 | 0.5 | 94 |

[1]Laboratory produced, coextruded on a base layer of homopolymer polypropylene then biaxially oriented 36:1 to produce a film of about .00075 inch (75 gauge) thick.
[2]Block conditions: 2 sec. moisture/ambient temp./2500 lbs. (500 psi) load 30 min./2 hrs./40° C. conditioning with 1 lb. load

Example II

| Cold Seal Film Release Surface Type | Cold Seal Block Force[1] (gms/in.) | | Comments |
|---|---|---|---|
| | Kraft Singles 16 slice/ commercial cold seal | M&M/Mars Snickers/ commercial cold seal | |
| Borden Commercial[2] Cold Seal Release Film 75 gauge APC | 25 | 15 | Non-corona treated surface release layer formulation |
| Ethylene (5.0% $C_2$) Propylene[3] Random Copolymer (60 wt %) Ethylene (0.5% $C_2$) Butylene Random Copolymer (40 wt %) | 25–35 | 25–35 | Non-corona treated, lab. produced, no organic or inorganic additives present |
| AET Commercial Competitive[4] Cold Seal Release Film 50 gauge B522 | 30 | 20 | Non-corona treated homopolymer polypropylene with amide and inorganic additives, fully bloomed |
| Mobil Commercial[5] Competitive Cold Seal Release Film 100 gauge CSR | 55–60 | 65–85 | Non-corona treated homopolymer polypropylene with inorganic additives |
| Borden Commercial[6] Non-slip modified industrial grade film 75 gauge A/NS | 40 | 75–80 | Non-corona treated homopolymer polypropylene with inorganic additive |

[1] Block conditions: 2 sec. moisture/ambient temp./2500 lbs. (500 psi) 30 min./2 hrs. 40° C. conditioning with 1 lb. load
[2] As described in Borden Technical Data Sheet APC #1 (1-25-94) incorporated by reference in its entirety
[3] Laboratory produced, coextruded on a base layer of homopolymer polypropylene then biaxially oriented 36:1 to produce a film of about 75 gauge thick
[4] As disclosed in Hercules Technical Bulletin FC-10E incorporated by reference in its entirety
[5] Mobil Chemical Company Technical description of BICOR CSR incorporated by reference in its entirety
[6] As described in Borden Technical Data Sheet ANS #1 (1-27-94) incorporated by reference in its entirety.

Unless otherwise indicated, all % in the specification and claims is an expression of wt %.

Modifications

Although I have disclosed the invention with regard to the composition and properties of a single web or laminate, having improved cold seal release properties, it is also within the scope of the invention to note that processors (known in the trade as "convertors") of the new webs or laminates, will further modify such webs or laminates so as to incorporate other desired or aesthetic features into my invention. For example, it may sometimes be desirable to metallize the inner side of the core layer, or even to provide one or more separate plies for lamination to the web or core layer.

It is also within the scope of the invention to surface treat the inner surface of the core or web so as to facilitate metallization, further lamination, or even facilitating the adhesion of the cold seal cohesives. Thus, plasma discharge or flame-spraying of the inner surface of the core or web are considered to be within the scope of the invention.

Additionally, surface modification of the skin layer so as to make it more receptive to ink, to facilitate printing is within the scope of the invention. Surface modification to make the skin layer more receptive to ink, such as corona discharge, flame-spraying, or other treatment known to increase ink receptivity is also within the scope of the invention.

Having now disclosed my invention, it is readily apparent to those skilled in the art that other modifications and variations may be made without departing from the spirit or scope of the appended claims.

I claim:

1. A coextruded biaxially oriented packaging film comprising:
   (A) a core layer having a thickness of about 50 to about 150 gauge and comprising at least one polymer selected from the group consisting of isotactic polypropylene homopolymer, ethylene-propylene copolymer, and high density polyethylene, said core layer having on one side thereof:
   (B) a skin layer having a thickness of about 2 to about 10 gauge and comprising at least 99.1 wt % of one polymer selected from the group consisting of linear low density polyethylene, ethylene-butene plastomer, syndiotactic polypropylene homopolymer, and high density polyethylene; and
   (C) an outer layer, on the side of the core layer opposite from the skin layer, said outer layer comprising a cohesive composition.

2. The film of claim 1 wherein the core layer is at least 94.2% by weight of isotactic polypropylene homopolymer and further comprises 0 to about 5 wt % high density polyethylene, 0 to 5,000 ppm erucamide, 0 to about 5,000 ppm behenamide, 0 to 5,000 ppm glycerol monostearate and 0 to 5,000 ppm of an amine.

3. The film of claim 1 further comprising a cold seal receptive surface on the surface of the film opposite said skin layer.

4. The film of claim 3 wherein the cold seal receptive surface is surface treated to make it more receptive to adherence of said cohesive composition.

5. The film of claim 4 wherein the surface treatment is by a method selected from the group consisting of corona discharge and flame treatment.

6. The film of claim 1 wherein said skin layer is at least 99.1 wt % linear low density polyethylene and further comprises up to 3,000 ppm of high density polyethylene, up to 2,500 ppm stearamide, up to 1,000 ppm Kaolin clay and up to 2,000 ppm of cross-linked silicone.

7. The film of claim 1 wherein the skin layer has its surface physically modified to be more receptive to ink.

8. The film of claim 7 wherein the surface modification is by corona discharge.

9. The film of claim 1 wherein the ethylene propylene copolymer is an ethylene-propylene random copolymer.

10. The film of claim 1 wherein the ethylene propylene copolymer is an ethylene-propylene block copolymer.

11. The film of claim 1 wherein the core layer is about 69.5 gauge and the skin layer is about 5.5 gauge.

12. The film of claim 1 wherein the thickness of said core layer is about 50 about 100 gauge.

13. The film of claim 1 wherein the cohesive is patterned.

14. The film of claim 1 wherein the core layer comprises isotactic polypropylene homopolymer.

15. The film of claim 14 wherein said skin layer is a cold seal release layer, said film further comprising a cold seal receptive layer on the side of the core layer opposite said cold seal release layer, said cold seal receptive layer having a thickness of about 1 to about 10 gauge and consisting essentially of a ethylene-propylene random copolymer containing about 2% to about 8% ethylene and about 92% to about 98% by weight propylene; and said cohesive composition is a cold seal cohesive composition on said cold seal receptive skin layer.

* * * * *